United States Patent [19]

Gibb

[11] 4,243,842
[45] Jan. 6, 1981

[54] TELEPHONE LINE CIRCUIT

[75] Inventor: William D. Gibb, Belleville, Canada

[73] Assignee: Northern Telecom Limited, Montreal, Canada

[21] Appl. No.: 32,866

[22] Filed: Apr. 24, 1979

[51] Int. Cl.³ .............................................. H04Q 1/28
[52] U.S. Cl. ............................. 179/18 FA; 179/16 F
[58] Field of Search ............. 179/18 F, 18 FA, 16 F, 179/77, 70, 2.5, 84 R, 84 A, 81 R; 323/48, 22 T

[56] References Cited

U.S. PATENT DOCUMENTS

| | | | |
|---|---|---|---|
| 3,714,548 | 1/1973 | Macrander | 323/48 |
| 4,046,967 | 9/1977 | O'Neill | 179/16 F |
| 4,046,968 | 9/1977 | Embree et al. | 179/16 F |
| 4,046,969 | 9/1977 | Dalley | 179/16 F |
| 4,056,689 | 11/1977 | Freimanis | 179/18 FA |
| 4,056,691 | 11/1977 | Freimanis et al. | 179/18 FA |
| 4,064,449 | 12/1977 | Macrander | 323/48 |
| 4,103,112 | 7/1978 | Korsky | 179/18 FA |

*Primary Examiner*—Thomas A. Robinson
*Attorney, Agent, or Firm*—Frank P. Turpin

[57] ABSTRACT

A telephone line circuit for supplying energizing current to a telephone line and for providing a voice frequency connection between the telephone line and an associated switching facility includes a transformer having a split primary winding, consisting of n turns, for connection across the telephone line and for connection to a power supply or battery. A first current flows in the split primary winding in proportion to the telephone line load characteristic. A balance winding in the transformer is connected in series with one portion of the split primary winding. The balance winding is counterwound relative to the split primary winding and consists of more than n turns. A circuit including a current regulator causes sufficient balance current to flow in the balance winding to substantially cancel the d-c flux associated with direct current in the split primary winding. The first and balance currents additively combine to produce the energizing current for the telephone line, whereby the load on the power supply is no greater than that of a conventional line circuit in spite of the balance current requirement.

10 Claims, 2 Drawing Figures

TELEPHONE LINE CIRCUIT

The invention relates to telephone line circuits in which an energizing current for a telephone line is supplied via a winding in a transformer and in an amount substantially as determined by the load characteristic of the telephone line. More particularly the invention relates to telephone line circuits in which the transformer includes a balance winding for reducing the direct current magnetic flux associated with the telephone line energizing current.

The desirability of utilizing direct current balanced transformers in telephone line circuits has been well known for some time. The reduction in the physical size of the transformer accrues economies in transformer cost and printed circuit board space utilization. The design of telephone line circuits with current balancing transformers has evolved into two different types, one being of the type in which the load resistance of the telephone line, in the off-hook condition, substantially determines the amount of energizing current drawn, and the other being of the type in which a predetermined amount of energizing current is supplied to the telephone line in the off-hook condition. Examples of line circuits of the first type are given by Max S. Macrander in U.S. Pat. Nos. 3,714,548 issued on Nov. 17, 1971 and 4,064,449 issued on Dec. 20, 1977, and by Vincent Viacheslav Korsky in U.S. Pat. No. 4,103,112 issued July 25, 1978. In each of these examples, a transformer includes a balance winding through which a balancing current is caused to flow in an amount appropriate to reduce or cancel the magnetic flux associated with the telephone line current. The balancing current is typically obtained from the same source as that which supplies the telephone line energizing current to the line circuit, however if need be the balancing current could be supplied from some other suitable source.

In a typical electronic private branch exchange (EPBX) using line circuits carried on printed circuit boards but without current balancing windings, it has been found that the necessarily heavy transformer tends to cause structural circuit board failure. This failure usually occurs when the circuit board is subjected to heavy shock loading, as for example during shipping. The solution to this problem appeared to be to replace the existing line circuits having the heavy transformer with line circuits having a miniature and relatively lightweight transformer including a balance winding to reduce the presence of direct current flux in accordance with the principles exemplified by M. S. Macrander or V. V. Korsky. This however requires that the EPBX power supply must be capable of supplying additional current for the operation of the balance winding. As the power supply in any given PBX is typically no larger than that required for normal operation of the PBX, this additional balance current required by each of the line circuits is of serious consequence. The extra current requirement prevents practical retrofitting of line circuits with balance windings into presently operating exchanges without the accompanying expense of upgrading the exchange's power supply.

A line circuit with a miniature transformer in accordance with the invention includes a balance winding in the transformer through which a fractional portion of the communication line energizing current is caused to flow. As the overall operational current requirement of the line circuit is similar to previous line circuits without a balance winding, the requirements of the associated power supply are likewise similar.

The present invention provides a line circuit for supplying an energizing current to a communication line. In the line circuit, a transformer has a split primary winding, consisting of n turns, for conducting the energizing current and a balance winding connected in series with the split primary winding. The balance winding is poled opposite to the split primary winding. A current regulator is connected in series combination with the balance winding for conducting a fraction of the energizing current through the balance winding. A conducting means, for conducting the remainder of the energizing current is connected in parallel across the series combination of the balance winding and the current regulator.

In one arrangement, the balance winding consists of more than n turns wound counter to the n turns of the split primary winding. The split primary winding consists of two portions, one portion being at least a fractional turn greater than the other portion. The balance winding is connected in series with said one portion of the split primary winding. In this arrangement an improvement in longitudinal balance is obtained.

In a further arrangement the conducting means is a resistance connected in series with the one portion of the split primary winding and conducts current through the split primary winding. The current regulator conducts current serially through the balance winding and the split primary winding, in response to a direct current potential developed across the resistance.

The invention also provides a method for reducing d-c flux in a line circuit transformer having a split primary winding consisting of n turns, for supplying an energizing current to a communication line, and a balance winding poled opposite to the split primary winding and consisting of more than n turns. The method includes the steps of conducting a first direct current serially via the split primary winding and the line, in an amount proportional to the load characteristic of the telephone line, and conducting a balance current serially via the balance winding, the split primary winding, and the line, in an amount predetermined in proportion to the first direct current. The balance current and the first direct current additively combine to provide the energizing current and the d-c flux associated with the energizing current in the transformer is substantially reduced.

Example embodiments of the invention will now be described with reference to the accompanying drawings in which.

Figure 1:
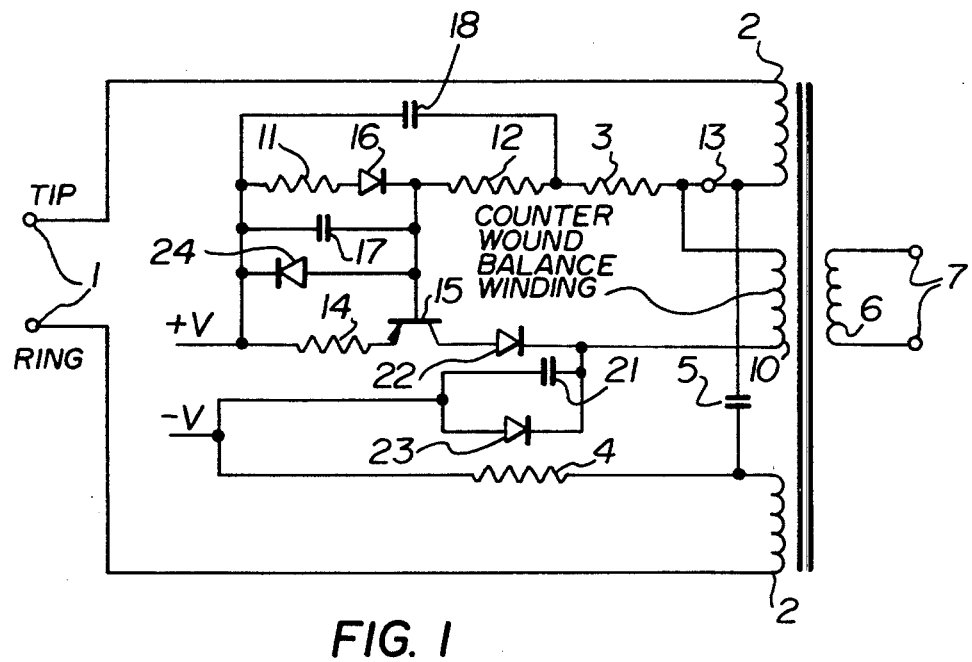
FIG. 1 is a schematic drawing of a telephone line circuit.

The telephone line circuit in FIG. 1 is intended for connection between a typical private branch exchange (PBX) telephone line, via tip and ring terminals 1, and an associated switching facility via terminals 7. The switching facility may be of the conventional metallic talking path type or one of the more recent time division multiplex (TDM) types in which case a codec is usually used to interface the line circuit with the switching facility. The line circuit includes a transformer with a split primary winding 2 connected across the tip and ring terminals 1 and a secondary winding 6 connected across the terminals 7. A capacitor 5 is connected between the two portions of the split primary winding. One portion of the split primary winding 2 is connected via terminal 13 and a current conducting network to a power source terminal +V. The current conducting network includes a resistor 11, a diode 16, a resistor 12, and a resistor 3, all connected in series. A capacitor 18 is connected between the terminal +V and the junction of the resistors 3 and 12. The transformer includes in addition, a balance winding 10 poled opposite to and having more turns than are present in the split primary winding 2. The balance winding 10 is connected between the terminal 13 and a current regulating network. The current regulating network includes a resistor 14 connected between the terminal +V and the emitter of a transistor 15. A diode 22 is connected between the collector of the transistor 15 and the balance winding 10 remote the terminal 13. The base electrode of the transistor 15 is connected to the junction between the diode 16 and the resistor 12. A capacitor 17 and a diode 24 are connected in parallel between the terminal +V and the base electrode of the transistor 15, the diode 24 being oriented in current opposing relationship. A capacitor 21 and a diode 23 are connected between a power source terminal −V and the junction of the diode 22 and the balance winding 10. A resistor 4 is connected between the other portion of the primary winding and the terminal −V.

An operational telephone line circuit is normally associated with a d-c supervision circuit and a ringing circuit. Various of these circuits and the use of same are generally well known to persons normally skilled in telephony. Hence examples of these circuits are not shown or described as they would not materially contribute to the understanding of the invention.

In operation, a telephone set (not shown) associated with the telephone line and in an off-hook condition completes a current path across the power source terminals +V and −V via the telephone line circuit. A first direct current flows from the terminal +V and via the resistors 11, 12 and 3, and diode 16, substantially as determined by the load characteristic of the telephone line and the telephone set. The first direct current causes a voltage, lower than the potential at the terminal +V, to be developed at the junction of the diode 16 and the resistor 12. This causes the transistor 15 to conduct a direct current, via the diode 22 and the balance winding 10, of sufficient magnitude to develop a voltage across the resistor 14 which corresponds to the voltage across the resistor 11. This current is hereafter referred to as a balance current. The balance current and the first direct current combine additively to provide an energizing current for the telephone line. The energizing current in the telephone line flows via the split primary winding 2 and the resistor 4 to the terminal −V. The balance current in the balance winding is determined by the ratio of the ohmic values of the resistors 11 and 14. The values of these resistors is chosen such that the balance current substantially cancels the d.c. flux associated with the energizing current in the split primary winding 2.

Alternating current signals are introduced at the transmitter in the telephone set and also from the secondary winding 6 in a well known manner. The capacitor 5 provides a voice frequency alternating current path between the two portions of the split primary winding 2. Alternating current feed impedances are substantially determined by the resistors 3 and 4, with the capacitor 18 providing a low impedance a-c path between the terminal +V and the junction of the resistors 12 and 3. The capacitor 17 provides an a-c ground at the base of the transistor 15 so that the balance current conducted by the transistor 15, is preferably void of any appreciable a-c component.

A line circuit constructed and operated in accordance with the preceding description will advantageously utilize a miniature transformer as compared to the more conventional line circuit without a balance winding. However, in spite of the balance current requirement, the former requires essentially no greater current supply than does the latter.

The balance winding 10 in any given transformer design has been found to have an influence upon the longitudinal balance characteristics of the line circuit. For example, in one design the balance winding 10 was wound in the same direction as the split primary winding 2 and connected to be poled opposite thereto in operation. In another design the balance winding was counter wound relative to the turns of the split primary winding. The one portion of the split primary winding, to which the balance winding is connected, includes about an extra half turn more than the other portion of the split primary winding. In this design a longitudinal balance improvement of several dB was obtained. Yet further improvement was obtained with the addition of the capacitor 21.

In one design of the transformer wherein it is required to match the typical telephone line a-c impedance with an input impedance in the switching facility of about 7000 ohms, the turns ratio of the balance winding 10 to the primary winding 2 is 3:2 disregarding the extra half turn. The current flow through the resistor 3 is about one-third of the energizing current and the current flow through the transistor 15 is about two-thirds of the energizing current. This is achieved by having the ohmic values of the resistors 14 and 11 corresponding to a ratio of 2:3 with the diode 16 compensating for the base emitter junction voltage drop in the transistor 15. During tests for longitudinal balance, a value of 200 picofarads was found to be satisfactory for the capacitor 21, however it is likely that the optimum value will vary from one design to the next.

The line circuit in FIG. 1 is intended for use in areas which are unlikely to be subjected to lightning strikes, as for example in the case of PBX telephone lines. However, in this use, the occurrence of high voltage hits from inadvertent or accidental power line crosses remains a distinct possibility. The diodes 22, 23 and 24 are therefore included to protect the transistor 15 in the event of such occurrence.

Figure 2:
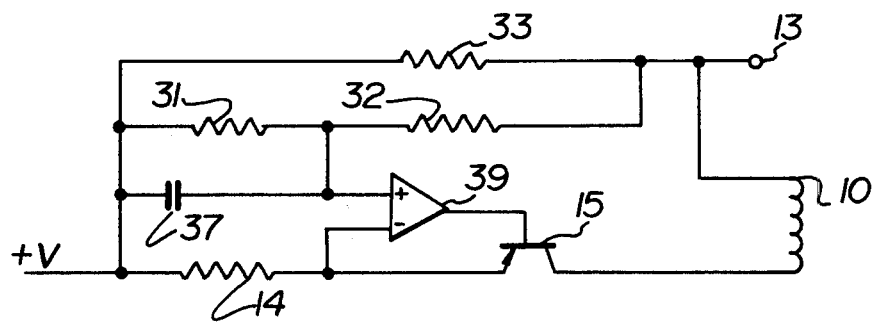
FIG. 2 is a simplified schematic drawing of an alternate circuit arrangement in the telephone line circuit in FIG. 1

The circuit shown in FIG. 2 can be directly substituted between the terminals +V and 13 in place of the corresponding circuits in FIG. 1. In this circuit, a resistor 33 carries the first current with the voltage developed thereacross being divided across resistors 31 and 32. The resistor 31 provides a function similar to that of the resistor 11 in FIG. 1. A capacitor 37 provides an a-c ground at the junction of the resistors 31 and 32. The balance winding 10, the transistor 15 and the resistor 14 remain and operate as previously described in reference to FIG. 1, however the base of the transistor is now connected to and driven by the output of a differential amplifier 39 connected in a voltage follower configuration. Components to enhance longitudinal balance and to provide overvoltage protection are not shown as they are similar to the components already described in relation to FIG. 1. As the differential amplifier 39 is a high input impedance device, this alternate embodiment carries cost reduction advantages over the line circuit in FIG. 1 in that the capacitor 18 is no longer required. Also the resistors 31 and 32 are of ohmic values in the order of tens to thousands of times greater than the resistor 33, and therefore the capacitor 37 is correspondingly very much reduced in size.

What is claimed is:

1. A line circuit for supplying an energizing current to a communication line, comprising:
    a transformer having a split primary winding for conducting the energizing current and a balance winding connected in series with and poled opposite to the split primary winding;
    a current regulator connected in series combination with the balance winding for conducting a fraction of the energizing current through the balance winding;
    means connected in parallel across the series combination of the balance winding and the current regulator for conducting the remainder of the energizing current;
    whereby the direct current flux associated with the energizing current in the split primary winding is reduced by the flux associated with the current in the balance winding.

2. A line circuit for supplying an energizing current to a communication line, comprising:
    a transformer having a split primary winding consisting of n turns and a balance winding consisting of more than n turns and poled opposite to the split primary winding;
    a resistance connected in series with the split primary winding for conducting a first portion of the energizing current through the split primary winding; and
    a current regulator responsive to a direct current potential developed across at least a portion of the resistance for conducting the remaining portion of the energizing current serially via the balance winding and the split primary winding, whereby the direct current flux associated with the energizing current is reduced by the flux resulting from the current in the balance winding.

3. A line circuit as defined in claim 2 wherein the balance winding is counter wound with respect to the split primary winding.

4. A line circuit as defined in claim 3 wherein the split primary winding has first and second portions, the first portion being at least a fractional turn greater than the second portion, and being connected to the balance winding.

5. A telephone line circuit for supplying energizing current to a telephone line from a power supply and for providing a voice frequency connection between the telephone line and an associated switching facility, the telephone line circuit comprising:
    a transformer having a split primary winding consisting of n turns, for connection across the telephone line and to the power supply, a secondary winding for connection to the switching facility, and a balance winding consisting of more than n turns, the balance winding being poled opposite to the split primary winding and being connected in series with one portion of the split primary winding;
    coupling means connected between the portions of the split primary winding remote the telephone line, for providing a voice frequency path therebetween;
    first means connected to the junction between the balance winding and the split primary winding for conducting a first current from the power supply serially via the split primary winding and the telephone line, the first current being conducted in an amount proportional to the load characteristic of the telephone line;
    second means including a current regulator connected in series with the balance winding for conducting a balance current, in predetermined proportion to the first current, from the power supply serially via the balance winding and the split primary winding and the telephone line, said first and balance currents additively combining to provide said energizing current.

6. A telephone line circuit as defined in claim 5 wherein said first conducting means comprises a first resistance for connection to the power supply, second and third resistances connected in series between the first resistance and said junction of the one portion of the split primary winding and the balance winding and a first capacitance connected in parallel across the first and second resistances; and wherein the second conducting means comprises a fourth resistance for connection to said power supply, a transistor having a collector electrode connected to the balance winding remote the one portion of the split primary winding and an emitter electrode connected in series with the fourth resistance and a base electrode connected to the junction between the first and second resistances, and a second capacitance connected across the base electrode and the fourth resistance remote the emitter electrode, the ohmic ratio of the first resistance to the fourth resistance being related to the turns ratio of the split primary winding to the balance winding such that the transistor conducts the balance current in an amount to substantially cancel the d.c. flux associated with the energizing current.

7. A telephone line circuit as defined in claim 5 wherein the current regulator in the second means comprises:
    first and second resistances connected in series across the first conducting means and a capacitor connected across the first resistance;
    a voltage follower circuit including a transistor having emitter base and collector electrode, the collector electrode connected to the balance winding, a fourth resistance connected in series with the emitter electrode, and a differential amplifier having an output, an inverting input connected to the junction of the fourth resistance and the emitter electrode, and a non-inverting input connected to the junction of the first and second resistances, the transistor being responsive to the output of the differential amplifier to conduct current in an amount of said predetermined proportion, said predetermined proportion being substantially determined by the ohmic ratio of the first and fourth resistors.

8. A telephone line circuit as defined in claims 5, 6 or 7 wherein the turns of the balance winding are counter wound with respect to the turns of the split primary winding and wherein said one portion of the split primary winding includes at least a fractional turn more than the turns in the other portion of the split primary winding, whereby longitudinal balance is improved.

9. A telephone line circuit as defined in claims 5, 6 or 7 wherein the turns of the balance winding are counter wound with respect to the turns of the split primary winding said one portion of the split primary winding incuding at least a fractional turn more than the turns in the other portion of the split primary winding, and further comprising a third capacitance connected between a.c. ground and the balance winding remote the one portion of the split primary winding, and being of a value suitable for improving the longitudinal balance of the telephone line circuit.

10. A method of reducing d.c. flux in a line circuit transformer having a split primary winding consisting of n turns, for supplying an energizing current to a communication line, and a balance winding poled opposite to the split primary winding and consisting of more than n turns, the method comprising the steps of:
 (a) causing a first direct current to flow serially via the split primary winding and said line, in an amount proportional to the load characteristic of the line;
 (b) causing a balance current to flow serially via the balance winding, the split primary winding and the line in an amount predetermined in proportion to the first direct current, to substantially cancel d.c. flux associated with the first direct current, the first direct current and the balance current additively combining to provide said energizing current.

* * * * *